May 29, 1923.
G. W. MASON
AUTOMOBILE DIRECTION SIGNAL
Filed Feb. 11, 1922
1,457,260
4 Sheets-Sheet 2
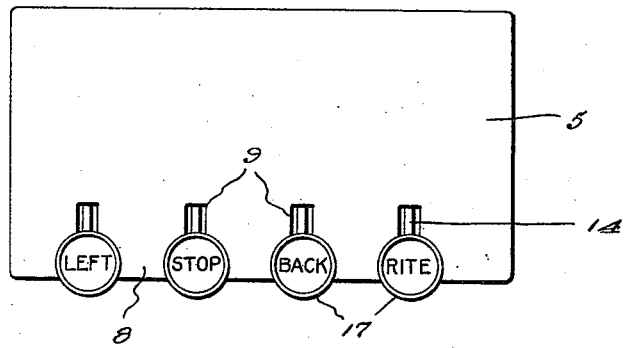
Fig. 2.
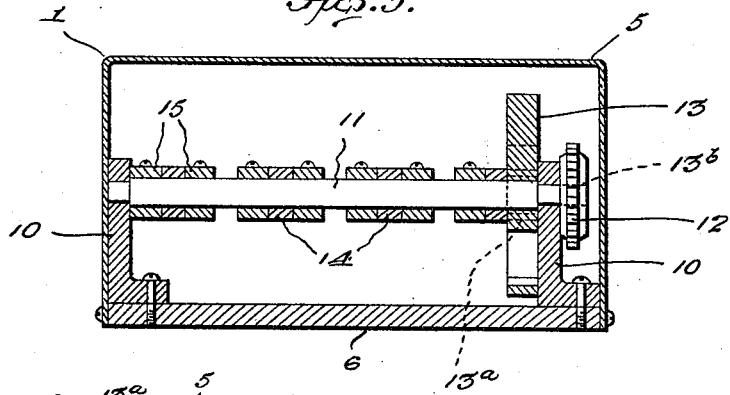
Fig. 3.
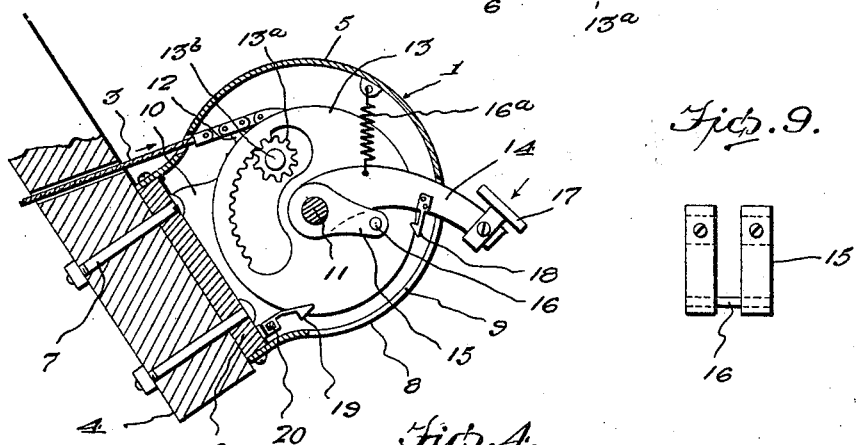
Fig. 4.
Fig. 9.
Geo. W. Mason
INVENTOR
BY Victor J. Evans
ATTORNEY May 29, 1923.
G. W. MASON
1,457,260
AUTOMOBILE DIRECTION SIGNAL
Filed Feb. 11, 1922     4 Sheets-Sheet 3
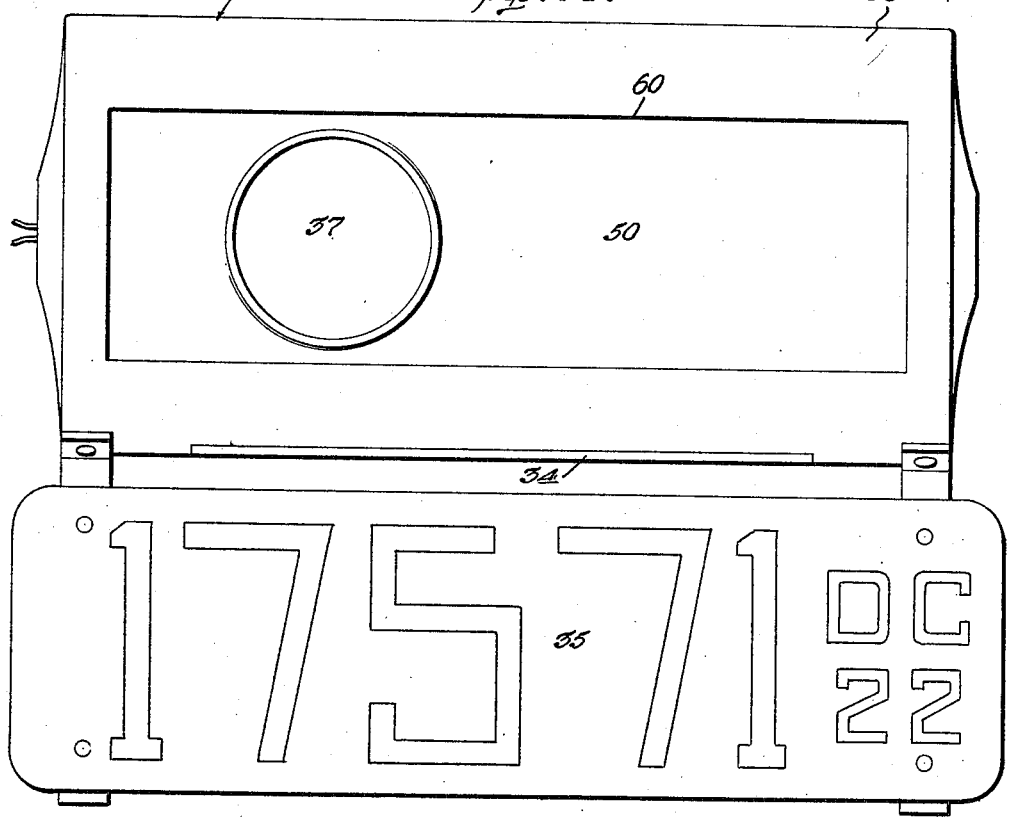
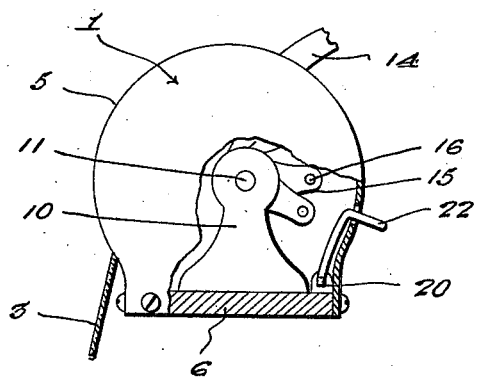
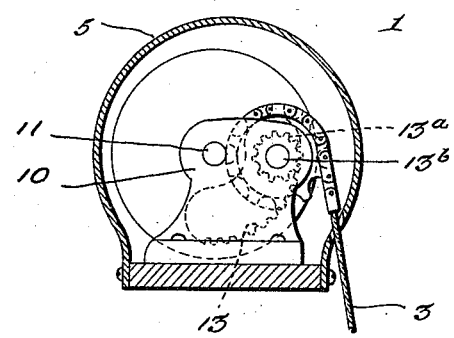
Geo. W. Mason
INVENTOR
BY Victor J. Evans
ATTORNEY May 29, 1923.

G. W. MASON 1,457,260

AUTOMOBILE DIRECTION SIGNAL

Filed Feb. 11, 1922

Geo. W. Mason
INVENTOR

BY Victor J. Evans
ATTORNEY

Patented May 29, 1923.

1,457,260

UNITED STATES PATENT OFFICE.

GEORGE W. MASON, OF LINCOLN, NEBRASKA.

AUTOMOBILE DIRECTION SIGNAL.

Application filed February 11, 1922. Serial No. 535,844.

*To all whom it may concern:*

Be it known that I, GEORGE W. MASON, a citizen of the United States, residing at Lincoln, in the county of Lancaster and State of Nebraska, have invented new and useful Improvements in Automobile Direction Signals, of which the following is a specification.

The object of my present invention is the provision of a compact direction signal adapted to be appropriately mounted at the back of an automobile and embodying means under the control of the driver, whereby at the pleasure of the driver various direction signals may be displayed for the guidance of the driver of a following automobile; the signal being illuminated by a single incandescent electric bulb and being adapted to illuminate a license tag, and the tail light being made to disappear when another signal is displayed with the result that the driver of a following car will be put on notice by the disappearance of the tail light and hence will look for the signal to inform him what the driver of the leading automobile intends to do.

To the attainment of the foregoing, the invention consists in the improvement as hereinafter described and definitely claimed.

In the accompanying drawings, forming part hereof:—

Figures 2 to 9 are detail views illustrative of the control and parts thereof.

Figures 10, 11, 12 and 13 are enlarged detail views illustrative of the automobile signal.

Figures 14 and 15, respectively, are front views of the "stop" and "left" signal plates.

Similar numerals of reference designate corresponding parts in all of the views of the drawings.

Figure 1:
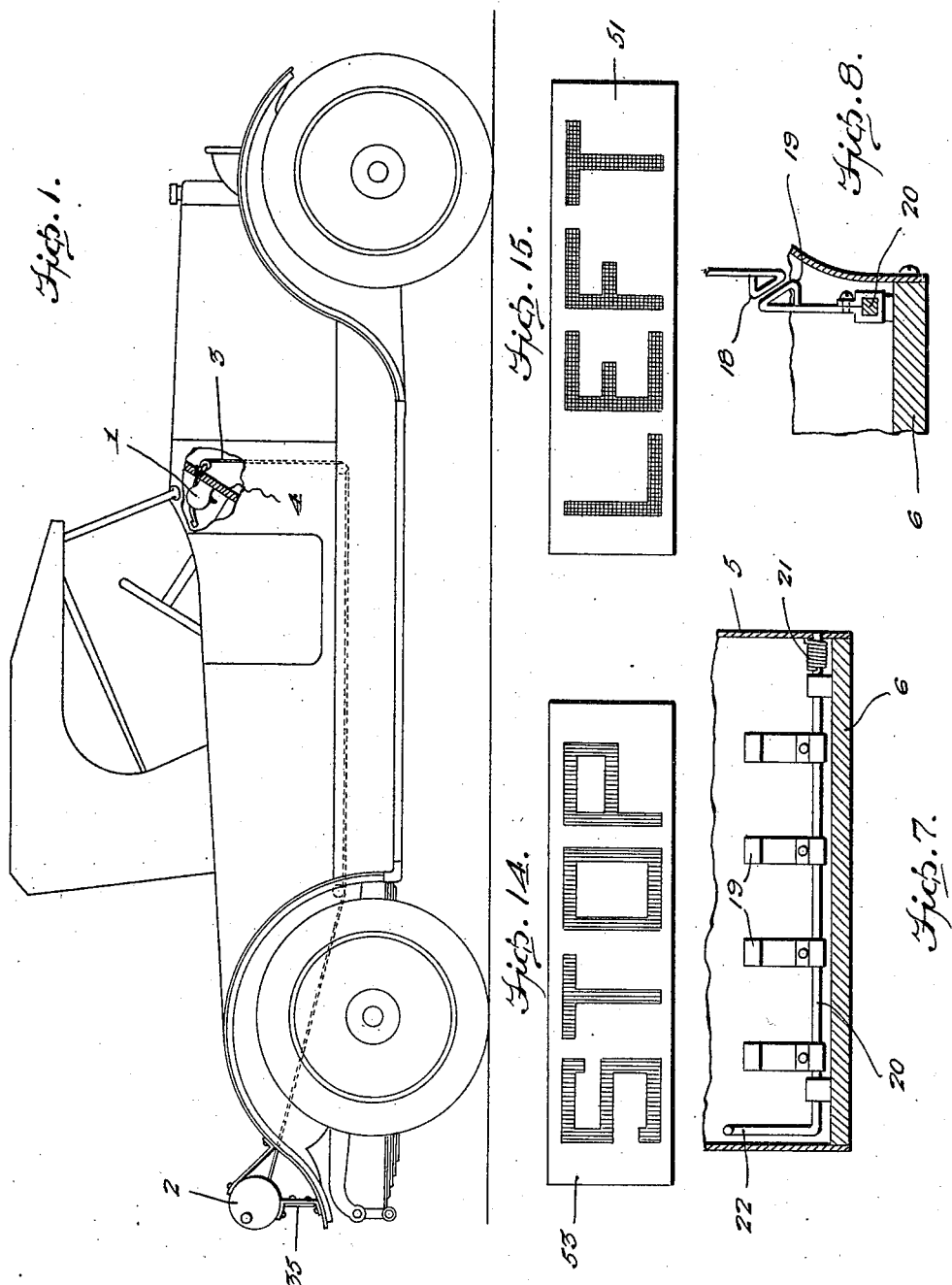
Figure 1 is a longitudinal vertical section of so much of an automobile as is necessary to illustrate the locations of the direction signal, the control therefor, and the means connecting the direction signal and the control.

By particular reference to Figure 1 it will be understood that the control of my improvement is numbered 1, the direction signal is numbered 2, and means connecting the control and the direction signal is numbered 3. The control 1 is carried on the instrument board 4 of the automobile and includes among other elements a casing 5, having a comparatively thick wall 6 opposed and bolted at 7 to the instrument board 4. In the wall 8 of the casing, which wall is preferably formed of sheet metal, is formed a plurality of, preferably four, slots 9. Within the casing 5 are brackets 10, and journaled in the said brackets is a longitudinal central shaft 11. As best shown in Figure 3 the shaft 11 is also provided with a drive gear 13 that is fast to the shaft, and with four levers 14 that are loose on the shaft and are movable in the said slots 9. Pinned or otherwise fixed on the said shaft 11 are lugs 15, said lugs being arranged in pairs, and the lugs of each pair being arranged at opposite sides of one lever 14. It will also be noted that the lugs 15 of each pair are connected by a cross pin 16 that is disposed under one of the levers 14 as best appears in Figure 4. Retractile springs 16ª are interposed between the levers 14 and the casing portion 5 with a view to yieldingly holding the levers 14 against and returning said levers 14 to the upper ends of the slots 9. On the levers 14 are buttons 17 which bear appropriate inscriptions such as "Left", "Stop", "Back" and "Rite". It will also be noted that each lever 14 is provided with a resilient and beveled catch 18, and that in the casing portion 5 are provided resilient and beveled keepers 19, one for each catch 18. The said keepers 19 are fixed to a rock shaft 20 in the casing portion 5, and the said rock shaft 20 is equipped with a torsion spring 21 which has for its function to normally retain the keepers 19 in the position shown in Figure 4. The said shaft 20 is also equipped with a lever 22 Figure 5 which extends through an opening in the casing portion 5 and is designed to enable the driver to readily rock the shaft 20 against the action of the spring 21 and thereby release the catches 18 from the keepers 19. The gear 13 is of internal type and its teeth are intermeshed with a spur gear 13ª on a countershaft 13ᵇ which also carries a sprocket gear 12 for a purpose hereinafter described.

Figure 12:
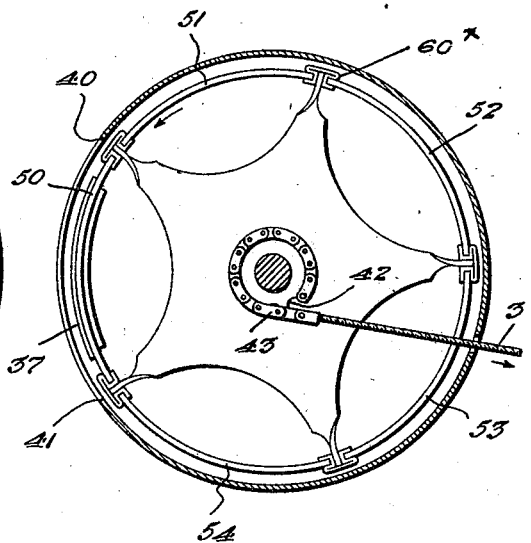

Carried by appropriate supports at the back of the automobile and which supports may be of any construction compatible with the purpose of my invention is a revoluble cylinder 30. In the longitudinal center of the said cylinder 30 is arranged an incandescent electric lamp bulb 31, the filament of which is connected with conductors 32 that lead through the tube 33 at one end of the cylinder and are designed to be connected with any appropriate source of electric energy. The cylinder 30 is disposed in a cylindrical casing 30ˣ, and one end of the said casing 30ˣ is preferably detachable, Fig. 13. It will also be observed that the casing 30ˣ is provided in its lower portion with a glazed opening 34 Figure 13 so that the license tag 35 carried by the casing 30ˣ will always be illuminated in the night time. The red light 36 carried by the casing 30ˣ at the end thereof shows at all times. The cylinder 30 is provided at 37 with a red tail light or danger signal which shows at all times except during the short periods of time when the other signals are displayed. The cylinder 30 is arranged to turn through four-fifths only of its circumference—i. e., from the point 40 in Figure 12 to the point 41 of the same figure. At 42 the cylinder is provided with a sprocket gear for the engagement of the chain 43 through which the cylinder is turned. The signal plates complementary to the cylinder are numbered 50, 51, 52, 53, and 54 and the plate 50 which directly carries the red tail light 37 is preferably of black metal. The signals 51 to 54 are preferably inscribed as illustrated; the plate 51 bearing the word "Left" on glass, the plate 52 bearing the word "Rite" on glass, the plate 53 bearing the word "Stop" in red letters on glass, the plate 54 bearing the word "Back" in red letters on frosted glass. I would also have it here understood that the plates 51, 52 and 53 are of frosted glass and that I prefer to have the words "Left" and "Rite" formed of black letters. The said plates are carried by holders 60ˣ in the cylinder as appears in Figure 12; the said holders being adapted to rest between and receive the longitudinal edges of the plates as best appears in Figure 12.

It will be apparent from the foregoing that my novel direction signal is materially advantageous inasmuch as it embodies but a single incandescent electric lamp bulb; and it will also be apparent that in the practical use of the direction signal the tail light is obscured only while another signal is displayed. This is materially advantageous inasmuch as in the night time a driver following a car equipped with my improvement would necessarily watch the tail light, and therefore when the driver of the car equipped with the improvement displays a signal, the rear driver will be immediately put on notice, and collision or other accident will be averted. It follows from the construction described that at no time is the novel signal dark, and that through the medium of the improvement and the manipulation of the control the driver is enabled to indicate to a following driver that he is going to stop or to move rearwardly or to turn to the left or to turn to the right, as the case may be.

All of the signals are displayed through the opening 60 of the casing 30ˣ, and hence when the cylinder 30 is turned to carry the plate 50 out of coincidence with the opening 60 the red lens 37 will also be carried out of coincidence with the opening 60 and will be obscured.

Figure 11:
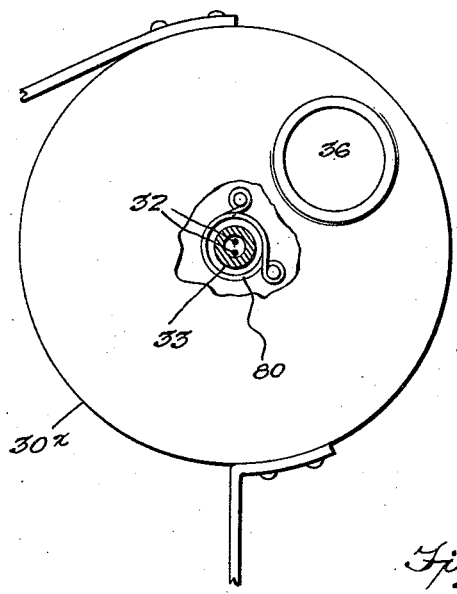
Figure 13:
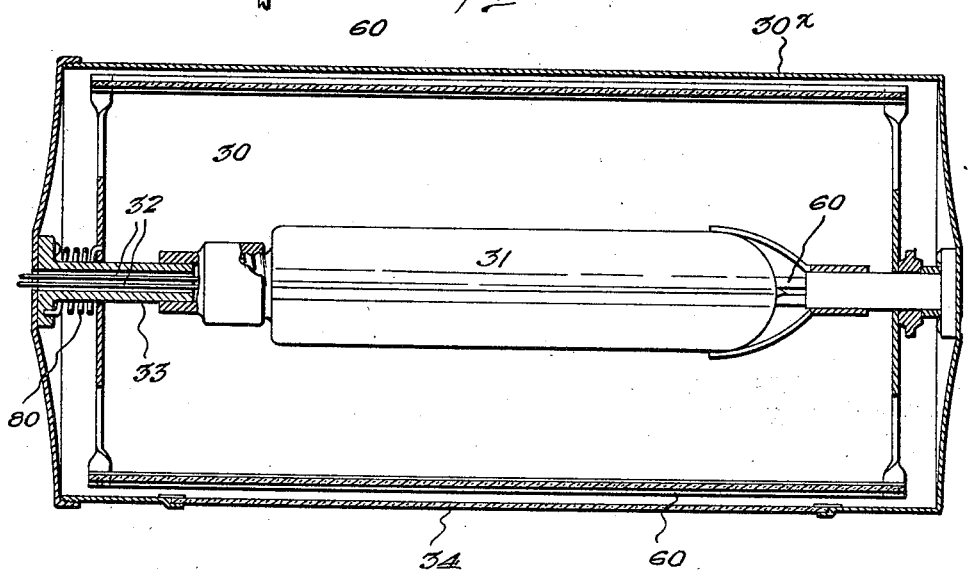

For the return of the cylinder 30 to normal position after movement and release thereof I provide the torsional spring 80, Figures 11 and 13.

In addition to the practical advantages ascribed to my improvement it will be appreciated that the improvement is simple, inexpensive and compact in construction, and that it is well adapted to withstand the rough usage to which automobile appurtenances are ordinarily subjected.

I have entered into a detail description of the construction and relative arrangement of parts embraced in the present and preferred embodiment of my invention in order to impart a full, clear and exact understanding of the said embodiment. I do not desire, however, to be understood as confining myself to the said specific construction and relative arrangement of parts inasmuch as in the future practice of the invention various changes and modifications may be made such as fall within the scope of my invention as defined in my appended claims.

Having described my invention, what I claim and desire to secure by Letters-Patent, is:—

1. A direction-signal control including a casing, a shaft journaled in bearings in the casing, a rock shaft journaled in bearings in the casing and equipped with resilient and beveled keepers, and also equipped with a handle operable without the casing, manually operable levers loose on the first named shaft and extending without the casing and movable relative to the casing, lugs fixed to the first named shaft and having portions opposed to and adapted to be engaged by said levers, spring means to return the levers to normal position, a drive gear fast on the first named shaft and having an internal arcuate toothed portion, and a gear meshed with said toothed portion.

2. A direction-signal control comprising a casing, a shaft journaled in bearings in the casing and having arms fast thereon, levers loose on the shaft and opposed to said arms, individual retainers complementary to the levers, means to simultaneously release the said retainers, a gear, and a drive connection intermediate of the shaft and said gear.

In testimony whereof I affix my signature.

GEORGE W. MASON.